(12) United States Patent
Thongrattana et al.

(10) Patent No.: US 9,401,164 B1
(45) Date of Patent: Jul. 26, 2016

(54) DEVICE FOR MEASURING A GRAM LOAD (71) Applicant: Western Digital Technologies, Inc., Irvine, CA (US)

(72) Inventors: Chaiya Thongrattana, Bangkok (TH); Angkhan Thongsuksai, Pathumtani (TH); Jetsada Nontree, Bangkok (TH); Teeraporn Srikwanjai, Nakonpratom (TH); Ruksakul Boonpuang, Ayutthaya (TH); Chainat Krudpuek, Ayutthaya (TH)

(73) Assignee: Western Digital Technologies, Inc., Irvine, CA (US)

( * ) Notice: Subject to any disclaimer, the term of this patent is extended or adjusted under 35 U.S.C. 154(b) by 210 days.

(21) Appl. No.: 14/133,556

(22) Filed: Dec. 18, 2013

Related U.S. Application Data (60) Provisional application No. 61/901,983, filed on Nov. 8, 2013.

(51) Int. Cl.
  *B23P 19/00* (2006.01)
  *G11C 5/12* (2006.01)
  *G11B 5/455* (2006.01)
  *G11B 5/48* (2006.01)
  *G11B 33/12* (2006.01)

(52) U.S. Cl.
  CPC .............. *G11B 5/455* (2013.01); *G11B 5/4833* (2013.01); *G11B 33/125* (2013.01)

(58) Field of Classification Search
  CPC .... G11B 5/455; G11B 5/4833; G11B 33/125; Y10T 29/49025; Y10T 29/49036; Y10T 29/53165; Y10T 29/53174; Y10T 29/53383
  USPC ............... 29/603.03, 603.04, 603.06, 603.07; 360/234.5, 245.8, 245.9, 264.2, 294.4, 360/294.6
  See application file for complete search history.

(56) References Cited

U.S. PATENT DOCUMENTS

| | | | |
|---|---|---|---|
| 4,603,567 A * | 8/1986 | Smith et al. | 72/16.9 |
| 5,297,413 A | 3/1994 | Schones et al. | |
| 5,637,807 A * | 6/1997 | Kliewer et al. | 73/862.541 |
| 5,842,270 A | 12/1998 | Tucker et al. | |
| 5,943,761 A * | 8/1999 | Tucker et al. | 29/603.03 |
| 6,512,657 B2 | 1/2003 | Heist et al. | |
| 6,556,382 B1 | 4/2003 | Tangren | |
| 7,082,670 B2 | 8/2006 | Boismier et al. | |
| 7,275,408 B1 * | 10/2007 | Balasubramaniam et al. | 72/342.1 |
| 7,506,552 B2 * | 3/2009 | Hernandez et al. | 73/862.191 |
| 2002/0148104 A1 * | 10/2002 | Slife et al. | 29/603.03 |

* cited by examiner

*Primary Examiner* — Paul D Kim (57) ABSTRACT

A gram load measurement assembly is configured to measure the gram load of a head stack assembly (HSA) of a disk drive being manufactured using the HSA's suspension tabs, thereby avoiding contact with the Air Bearing Surface (ABS) of the HSA's sliders when checking the gram load forces after the installation of the Head Gimbal Assembly (HGA) installation on the actuator assembly.

8 Claims, 10 Drawing Sheets

DEVICE FOR MEASURING A GRAM LOAD

CROSS-REFERENCE TO RELATED APPLICATIONS

This application claims the benefit of U.S. Provisional Patent Application Ser. No. 61/901,983 entitled "HSA GRAM LOAD MEASURMENT USING SUSPENSION TAB" filed Nov. 8, 2013, the disclosure of which is incorporated by reference herein in its entirety.

BACKGROUND

A typical hard disk drive includes a head disk assembly ("HDA") and a printed circuit board assembly ("PCBA"). The HDA includes at least one magnetic disk ("disk"), a spindle motor for rotating the disk, and a head stack assembly ("HSA") that includes a slider with at least one transducer or read/write element (also called "head") for reading and writing data. The HSA is controllably positioned by a servo system in order to read or write information from or to particular tracks on the disk. The typical HSA has three primary portions: (1) an actuator arm assembly that moves in response to the servo control system; (2) a head gimbal assembly ("HGA") that extends from the actuator arm assembly and biases the slider toward the disk; and (3) a flex cable assembly that provides an electrical interconnect with minimal constraint on movement.

A typical HGA includes a load beam, a gimbal attached to an end of the load beam, and a slider attached to the gimbal. The load beam has a spring function that provides a "gram load" biasing force and a hinge function that permits the slider to follow the surface contour of the spinning disk. The load beam has an actuator end that connects to the actuator arm and a gimbal end that connects to the gimbal that supports the slider and transmits the gram load biasing force to the slider to "load" the slider against the disk. A rapidly spinning disk develops a laminar airflow above its surface that lifts the slider away from the disk in opposition to the gram load biasing force. In this state, the slider is commonly said to be "flying", although the sliders do not, in fact, fly or develop an aerodynamic force like lift (as air foils do due to the Bernoulli effect).

DETAILED DESCRIPTION

Figure 1:
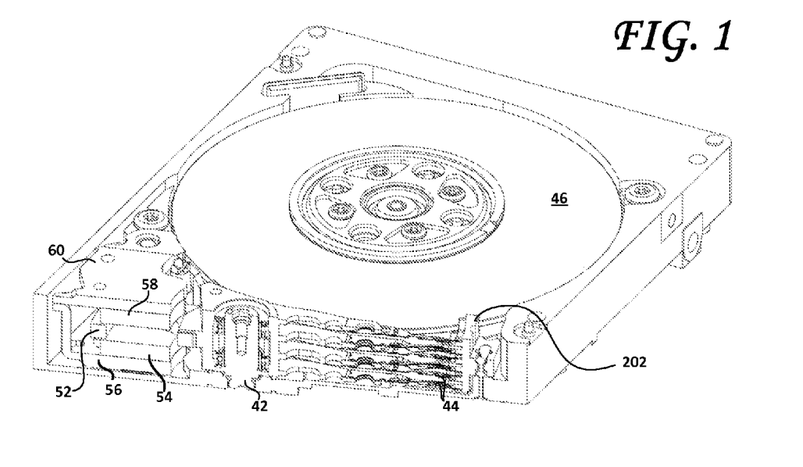
FIG. 1 is a cross-sectional view of a HSA in a HDA, showing a cut-away view of the pivot bearing cartridge and the top and bottom Voice Coil Motor (VCM) plates.
Figure 2:
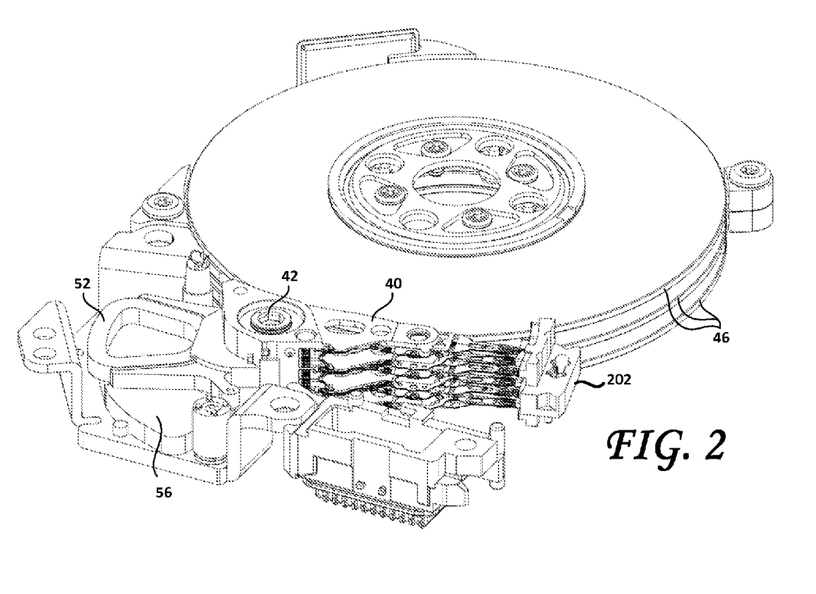
FIG. 2 is a cross-sectional view of a head stack in an HDA, with the top VCM plate removed.
Figure 3:
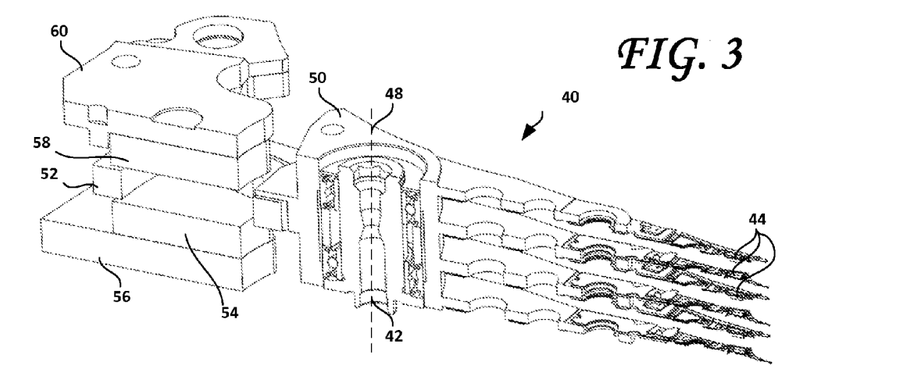
FIG. 3 is a cross-sectional view of an actuator arm assembly, showing the pivot bearing cartridge in cross-section.

In a modern hard disk drive, and with reference to FIGS. 1, 2 and 3, the HSA 40 is pivotally secured to the base of the drive via a pivot-bearing cartridge 42 so that the read/write transducer(s) of sliders 44 at the distal end of the suspension assembly(ies) may be moved over the recording surface(s) of the disk(s) 46. The pivot-bearing cartridge 42 enables the HSA 40 to pivot, and includes a bearing cartridge and a pivot shaft that defines an axis 48 about which the actuator rotates when power is applied to the VCM. The "rotary" or "swing-type" actuator assembly rotates on the pivot bearing cartridge 42 between limited positions, and the coil assembly 52 that extends from one side of the body portion 50 of the actuator body of the HSA 40 is disposed between and interacts with a first permanent magnet 54 mounted to a bottom VCM plate 56 and a second permanent magnet 58 mounted to a top VCM plate 60 to form the VCM formed by the bottom VCM plate 56, the first permanent magnet 54, the coil assembly 52, the second permanent magnet 58 and the top VCM plate 60. In operation, when a driving voltage is applied to the VCM, torque is developed that causes the HSA 40 to pivot about the actuator pivot axis 48 and causes the read/write transducer(s) of the sliders 44 to sweep radially over the disk(s) 46. Most modern drives use a feedback mechanism so that small changes in applied voltage are operative to position the read/write transducer(s) of the sliders 44 precisely over the disk(s) 46.

The increasing number of disks in the disk pack, in particular, has engendered a corresponding increase in the number of actuator arms (four such actuator arms being shown in FIGS. 1-3) on the HSA 40. Indeed, FIG. 4 shows a side view of an HSA having six actuator arms that support fully ten sliders comprising read/write actuators configured to read and write data to and from 5 magnetic disks sandwiched therebetween.

Figure 4:
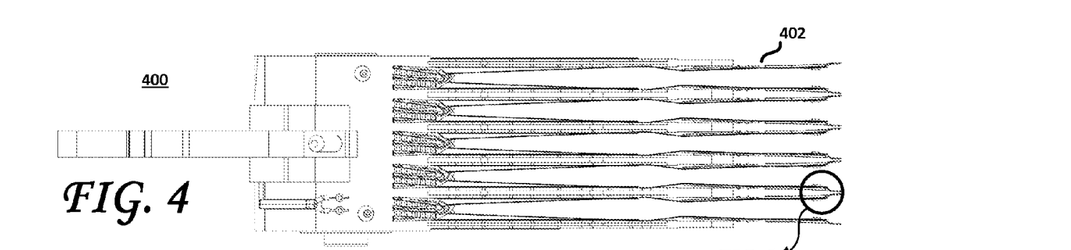
FIG. 4 is a side view of a HSA.
Figure 5:
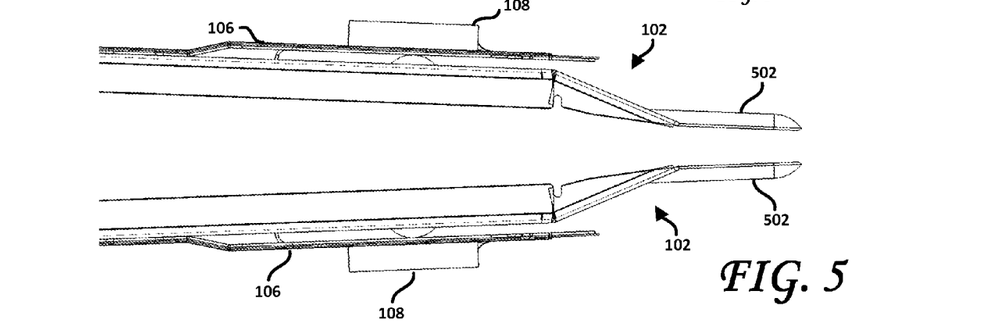
FIG. 5 is a detail side view of a pair of the HGAs and suspension or lift tabs shown in FIG. 4.

FIG. 5 is a detail side view of a pair of the HGAs and suspension or lift tabs shown in FIG. 4. FIG. 5 shows two HGAs 102. Each HGA 102 may comprise a load beam 402 (best seen in FIG. 4), a gimbal 106 and a slider 108 attached to the gimbal 106. The free distal end of the HGA may comprise a suspension tab 502. The suspension tab 502 may be configured, among other functions, to enable the heads to be loaded (parked) onto and unloaded from a ramp 202 (best shown in FIGS. 1 and 2) disposed at the outer diameter (OD) of the disks 46. The slider 108 comprises a read head for reading and writing data from and to a magnetic disk (e.g. disk 46). The read head includes a slider substrate having an ABS (the label 108 points to this surface). The slider substrate may comprise AlTiC, although another ceramic or silicon materials may also be used. The slider substrate of the read head 210 also includes a trailing face that includes a read/write transducer (too small to be practically shown in the figures). In certain embodiments, the read/write transducer may comprise an inductive magnetic write transducer merged with a magneto-resistive read transducer. One purpose of the load beam 402 is to provide limited vertical compliance for the read head of the slider 108 to follow the vertical undulations of the surface of a disk (e.g. disk 46 of FIG. 1) as it rotates, and to preload the air bearing surface of the read head against the disk surface by the aforementioned "gram load."

Figure 6:
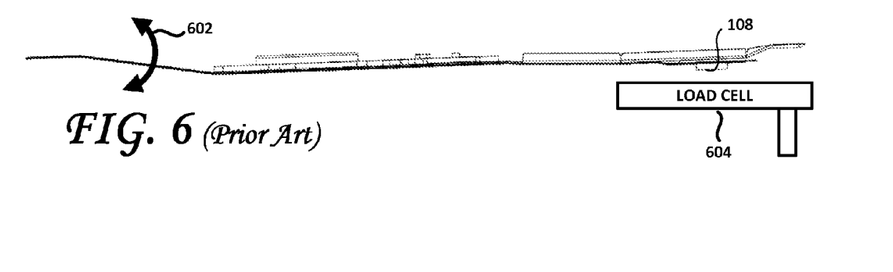
FIG. 6 shows the gram load spring biasing force imposed upon a slider Air Bearing Surface (ABS) during conventional gram load measurement.

FIG. 6 shows the gram load spring biasing forces 602 that are imposed upon a slider ABS during conventional gram load measurement. As shown, a conventional method of gram load measurement uses the ABS as a reference datum for the measurement of the spring force 602. That is, the load beam, which may be under compression or tension, is made to move (e.g., released from a previously constrained initial configuration and position) such that the ABS of the slider 108 is made to contact the opposing surface of a load cell 604. The resulting force imposed upon the load cell 604 by the ABS of the slider 108 is measured and is related to the gram load. Such a system presents two major issues; namely, ABS surface damage and contamination. Indeed, the ABS-to-load cell contact may damage the delicate structures of the ABS and/or the facing surface of the load cell 604 may transfer contaminants onto the ABS of the slider 108, potentially negatively affecting operation of the slider 108 above the disks 46.

Figure 7:
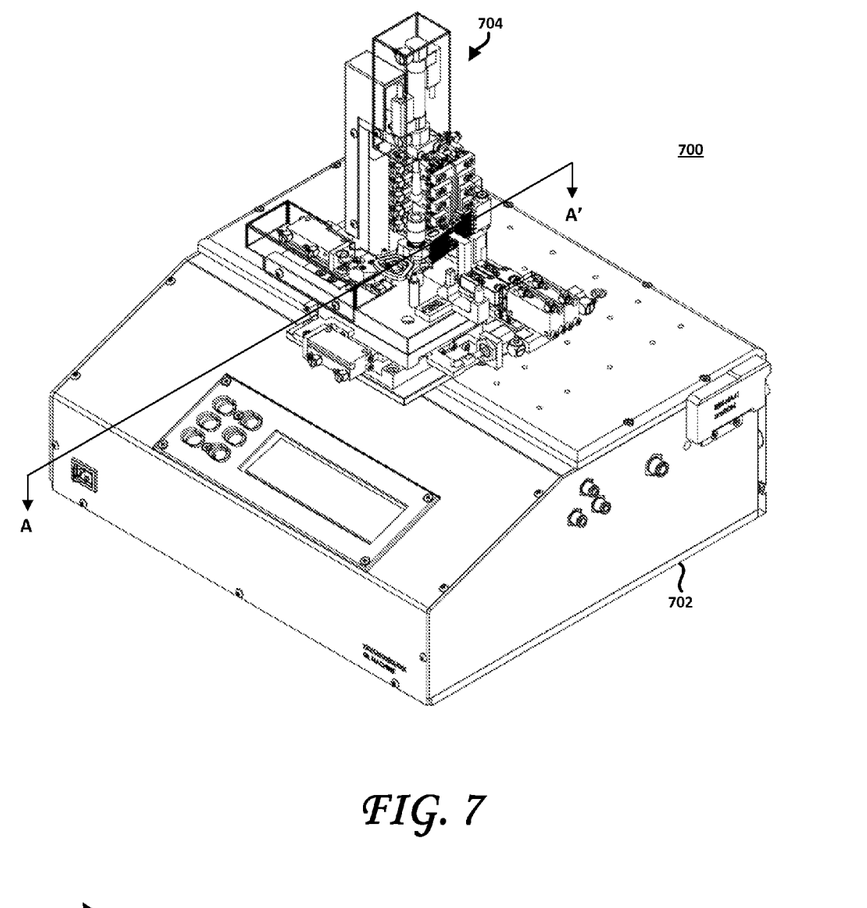
FIG. 7 is a diagram of a gram load measurement assembly configured for the measurement of HSA gram load using the suspension tabs of the HSAs, according to one embodiment.

One embodiment comprises a gram load measurement assembly that does not rely upon the ABSs of the sliders-to-load cell contact to accurately measure the gram load. FIG. 7 is a diagram of such a gram load measurement assembly 700, configured for the measurement of HSA gram load without physical contact between the load cell and the sliders of the HSAs. As shown, the gram load measurement assembly 700 may comprise, according to one embodiment, a base assembly 702 that supports a top tooling assembly 704. Characteristics and functionality of each is described hereunder and shown in the figures.

Figure 8:
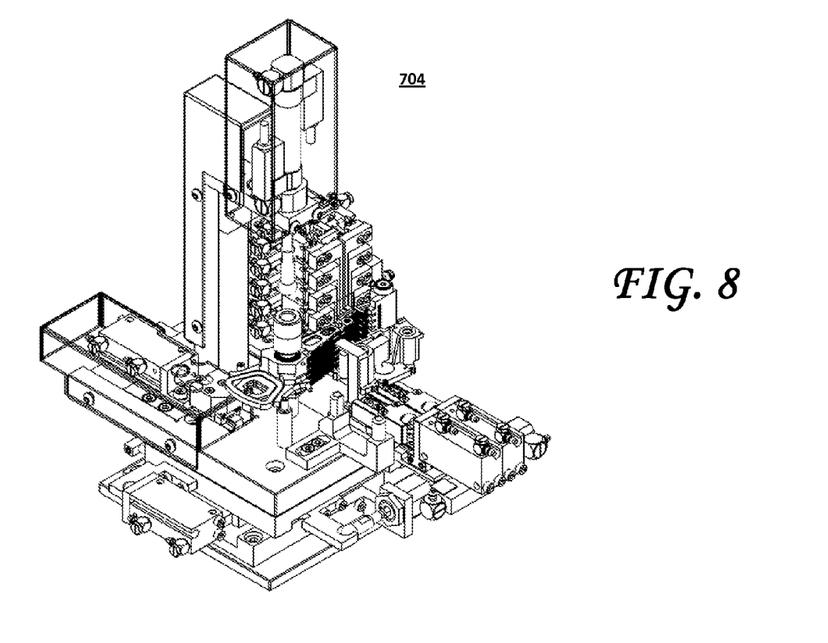
FIG. 8 is a diagram of a top tooling assembly of the gram load measurement assembly of FIG. 7, according to one embodiment.
Figure 9:
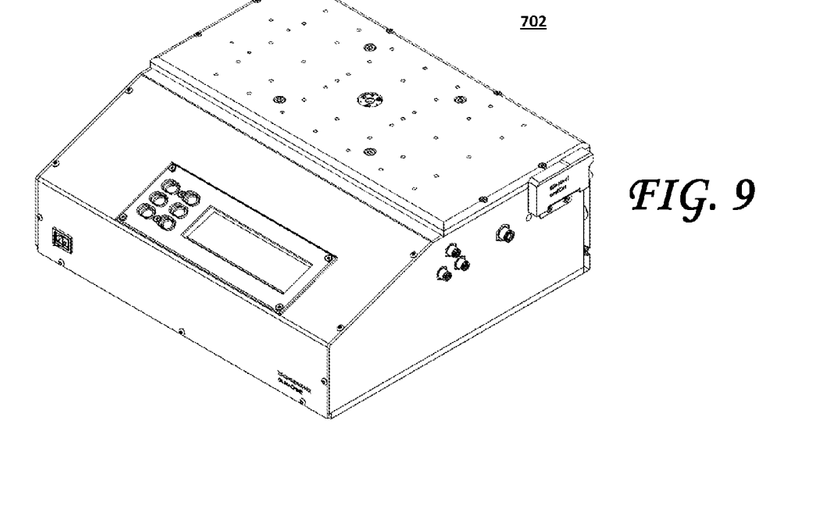
FIG. 9 is a diagram of a base assembly of the gram load measurement assembly of FIG. 7, according to one embodiment.

FIG. 8 is a diagram of a top tooling assembly 704 of the gram load measurement assembly 700 of FIG. 7, according to one embodiment. FIG. 9 is a diagram of the base assembly 702 of the gram load measurement assembly 700 of FIG. 7, according to one embodiment. FIGS. 8 and 9 are shown at different scales, for clarity of illustration. According to one embodiment, the top tooling assembly 704 may comprise structure configured to clamp and hold captive an actuator assembly and to position the load beams of the HGAs thereof in a manner suitable to enable the measurement of the respective gram loads thereof. The base assembly 702 of FIG. 9 may be configured, according to one embodiment, to house a user interface and controls configured to enable a human or machine operator to operate the gram load measurement assembly 700. The base assembly 702 may also house a load cell assembly that is acted upon by structure of the top tooling assembly 704 and that generates a corresponding output signal from which a gram load measurement may be derived.

Figure 10:
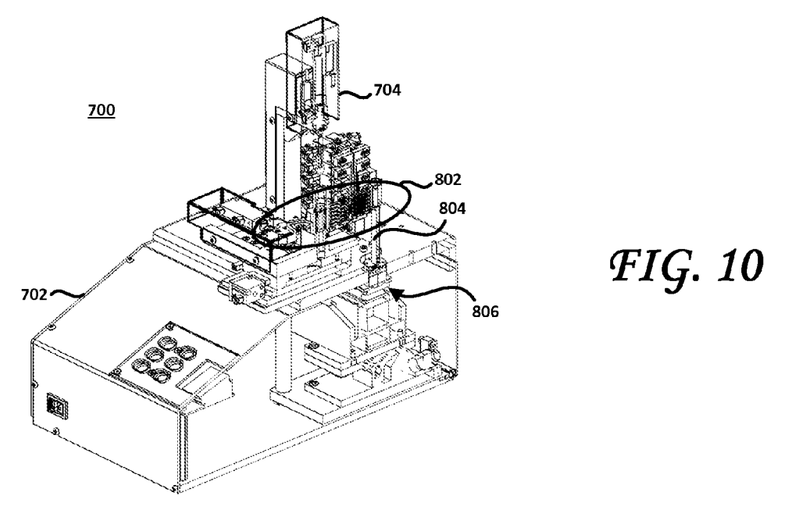
FIG. 10 is a cross-sectional view of the gram load measurement assembly of FIG. 7.
Figure 11:
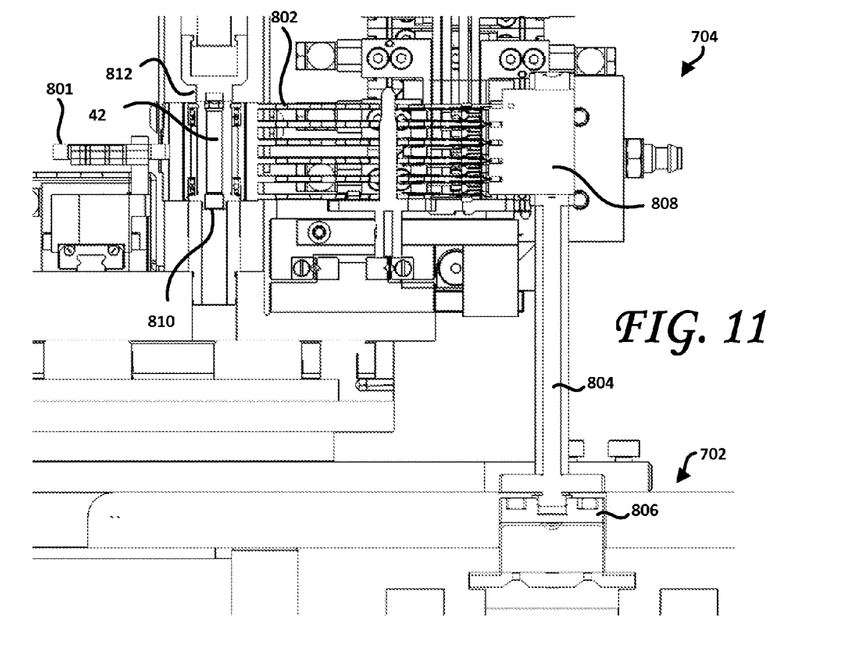
FIG. 11 is a detail cross-sectional view of the of the gram load measurement assembly of FIG. 7, showing the clamped captive HSA, a load cell tower and a load cell disposed in the base assembly, according to one embodiment.

FIG. 10 is a cross-sectional view of the gram load measurement assembly 700, along cross-sectional line AA' of FIG. 7. FIG. 11 is a detail cross-sectional view of the base assembly 702 of the gram load measurement assembly 700. FIG. 10 shows the HSA 802 mounted in and help captive by the top tooling assembly 704, a load cell tower 804 and a load cell assembly 806. The top tooling assembly 704, according to one embodiment, may be configured to measure the force imparted upon a disk simulator assembly by the HGAs of the captive HSA. The disk simulator assembly may be coupled to a load cell tower 804 such as to mechanically transmit the imparted force onto the load cell tower 804. The load cell tower 804, in turn, may be coupled to load cell assembly 806 in the base assembly 702, which load cell assembly 806 may be configured to generate an output signal that may be proportional or otherwise related to the gram load being measured.

FIG. 11 is a detail cross-sectional view of the base assembly 702 of the gram load measurement assembly 700. FIG. 11 shows a HSA 802 held captive by the top tooling assembly 704. In detail, the top tooling assembly 704 may comprise a disk drive actuator clamping assembly comprising a first pivot datum 810 and a second pivot datum 812. The top tooling assembly 704 may be configured, according to one embodiment, to cause the first pivot datum 810 and the second pivot datum 812 to clamp down on the pivot bearing cartridge 42 (also readily visible in FIGS. 1, 2 and 3) of the HSA (along actuator pivot axis 48, for example). The top tooling assembly 704, in this manner, holds the HSA under test captive, to enable accurate measurement of the gram load forces.

Figure 12:
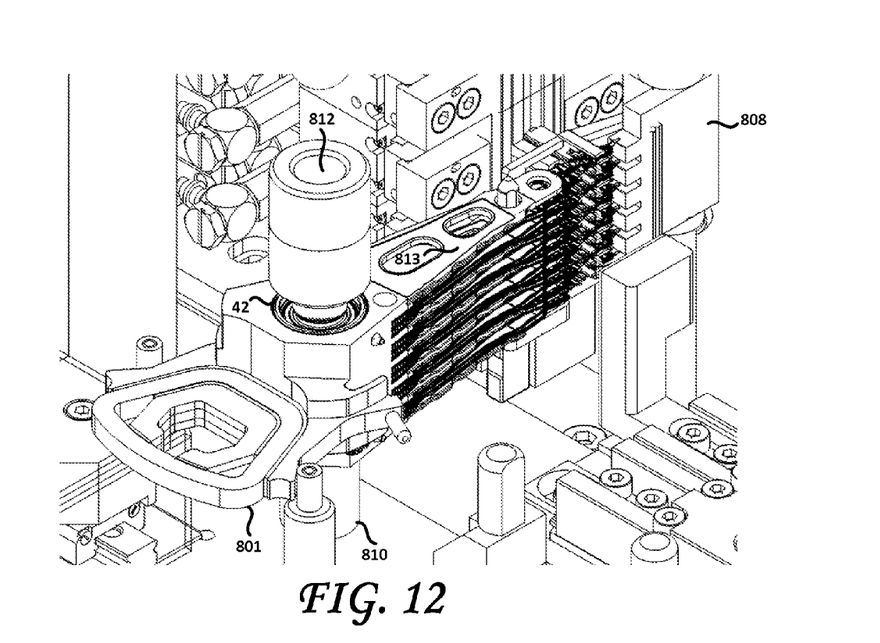
FIG. 12 is a perspective view of a captive HSA mounted in a gram load measurement assembly, according to one embodiment.

FIG. 12 is a perspective view of an HSA mounted in a gram load measurement assembly 700 according to one embodiment. Shown in FIG. 12 is the VCM 801, the actuator body into which the pivot bearing cartridge 42 is fitted, and actuator arms 813 terminated by the respective HGAs of the HSA. According to one embodiment, the HSA and the disk simulator assembly are disposed within the gram load measurement assembly 700 such that there is no contact between the respective ABSs of the sliders (or the slider in its entirety) and any surface during the gram load measurement. Indeed, according to one embodiment and as shown in FIG. 12, during the gram load measurement, it is the distal free ends of the HGAs of the HSA that are made to selectively contact the disk simulator assembly 808 and/or any load cell bearing surface during the gram load measurement procedure, rather than ABSs of the sliders.

Figure 13:
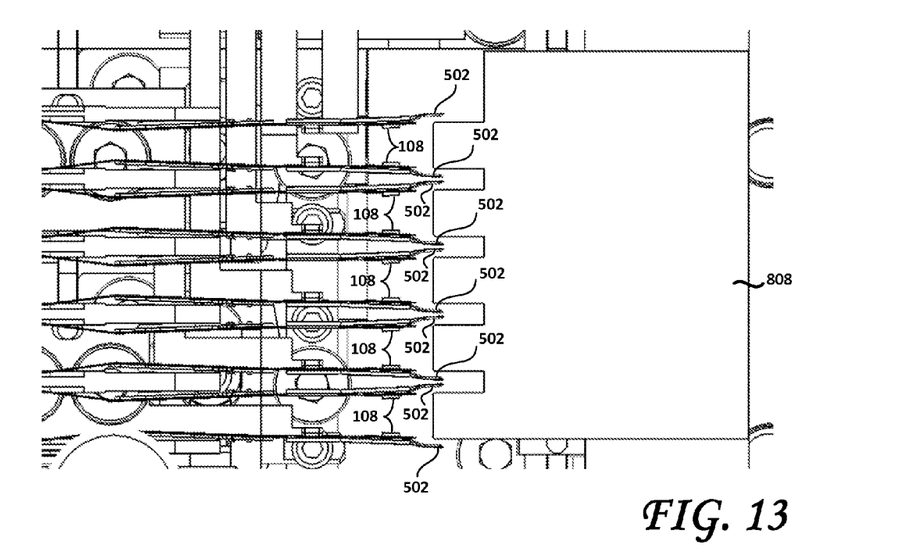
FIG. 13 is a side detail view of the captive HSA mounted in a gram load measurement assembly, according to one embodiment.

According to one embodiment and as shown in FIG. 13, it is the suspension tabs 502 (also called lift tabs) disposed at the distal free end of the load beams of the HGAs that are positioned to bear against corresponding surfaces of the disk simulator assembly 808, thereby sparing the more proximally-disposed sliders any potentially damaging contact therewith. As shown, each of the suspension tabs 502 faces a bearing surface of the disk simulator assembly 808 against which the suspension tab will bear during the gram load measurement procedure, thereby exerting a force against that bearing surface, which force may be transmitted to and measured by the load cell assembly 806 within the base assembly 702. As also shown, the sliders 108 and their respective ABSs are disposed well away from the disk simulator assembly 808, sparing them from potential contamination and damage.

Figure 14:
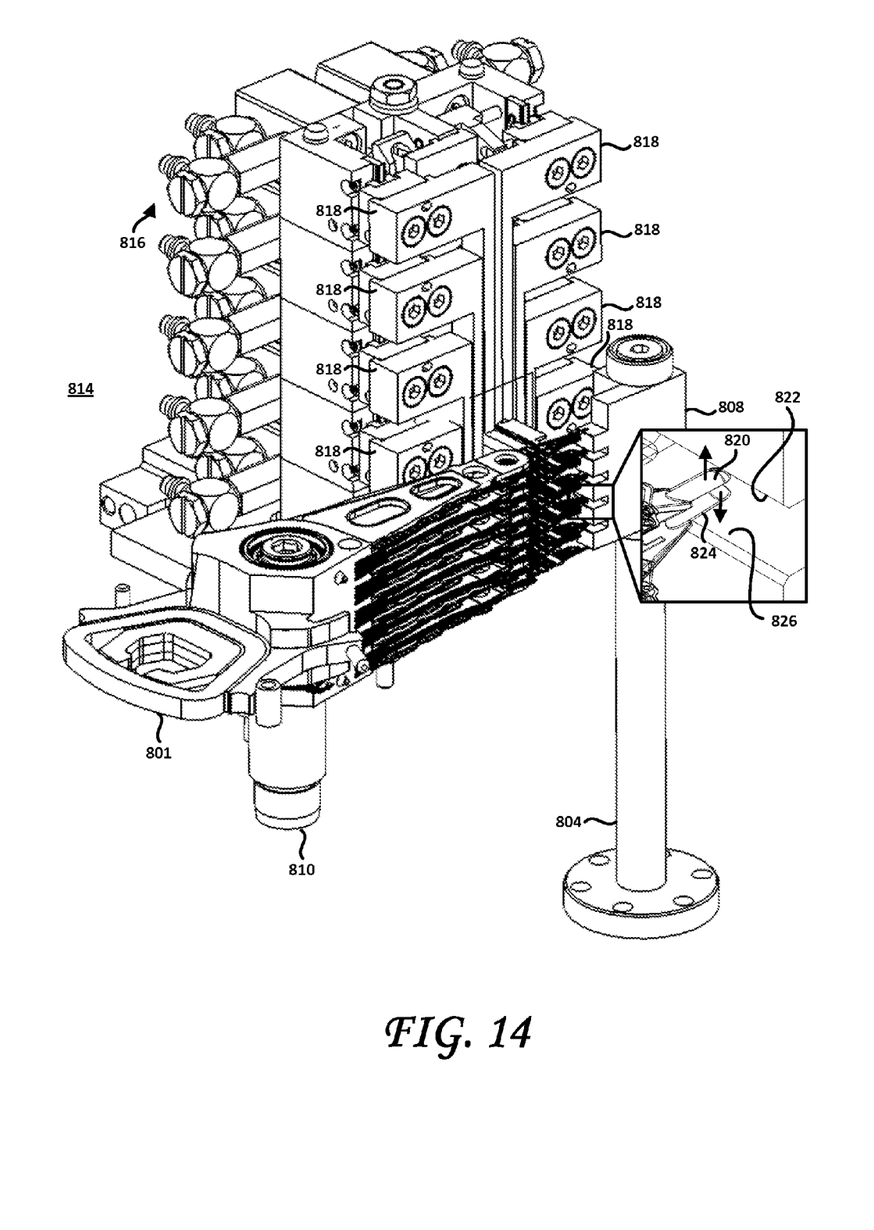
FIG. 14 is a perspective view of a disk drive actuator clamping assembly and a captive HSA, according to one embodiment.

To properly position the suspension tabs of the HSA under test to face the corresponding bearing surfaces of the disk simulator assembly 808, the load beams thereof (attached to the distal end of the actuator arms of the actuator assembly) may be manipulated so as to separate facing sliders 108 away from one another. Once separated, the suspension tabs 502 are in a configuration in which they may be inserted within the openings or features of the disk simulator assembly 808. Alternatively, the disk simulator assembly 808 may be moved into position such that the respective suspension tabs of the HGAs fit within openings and face their corresponding bearing surfaces. In this configuration, the suspension tabs 502 face corresponding bearing surfaces if the disk simulator assembly 808. According to one embodiment, a head spreader assembly is configured to separate the facing sliders 108 from one another. FIG. 14 shows aspects of such a head spreader assembly 814.

Figure 15:
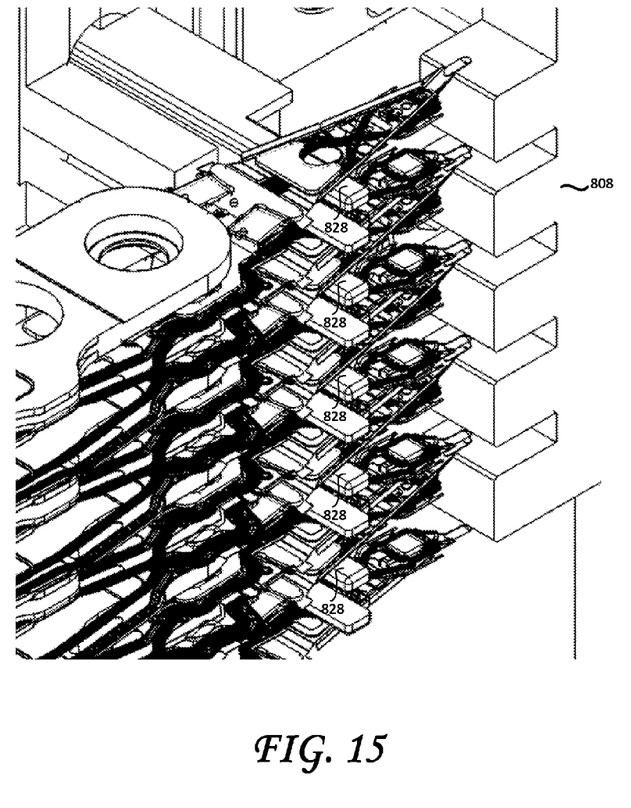
FIG. 15 is a detail view of FIG. 14, showing the head spreader tabs disposed between the respective HGAs of the HSA.

The head spreader assembly 814, according to one embodiment, may comprise a plurality of head spreader tabs, one for each of the HGAs of the HSA. Some of the head spreader tabs are shown in FIG. 15, at reference numeral 828. In the implementation illustrated in FIG. 14, six such head spreader tabs are provided and actuated by a, for example, pneumatic air gripper assembly 816. The pneumatic air gripper assembly 816 may comprise a plurality of spreader tab actuation elements 818, each of which may be mechanically coupled to a corresponding one of the head spreader tabs 828. According to one embodiment, when the gram load of, for example, head 0 (coupled to the top-most HGA in FIG. 14) is to be measured, a corresponding one of the spreader tab actuation elements 818 may be actuated by the pneumatic air gripper assembly 816 to cause the head spreader tab coupled thereto move away from the HGA with which it was in contact, thereby enabling the corresponding suspension tab 502 to come into contact with and bear against a corresponding surface on the disk simulator assembly 808, which bearing force may then be measured by the load cell assembly 806 within the base assembly 702. For example, when it comes time to measure the gram load of head 5, the corresponding head spreader tab is moved away from the HGA to which head 5 is coupled, causing the suspension tab 820 thereof to move towards and bear against a facing surface 822, as suggested by the up-facing arrow. Similarly, when it comes time to measure the gram load of head 6, the corresponding head spreader tab is moved away from the HGA to which head 6 is coupled, causing the suspension tab 824 thereof to move towards and bear against a facing surface 826 of the disk simulator assembly 808, as suggested by the down arrow.

Figure 16:
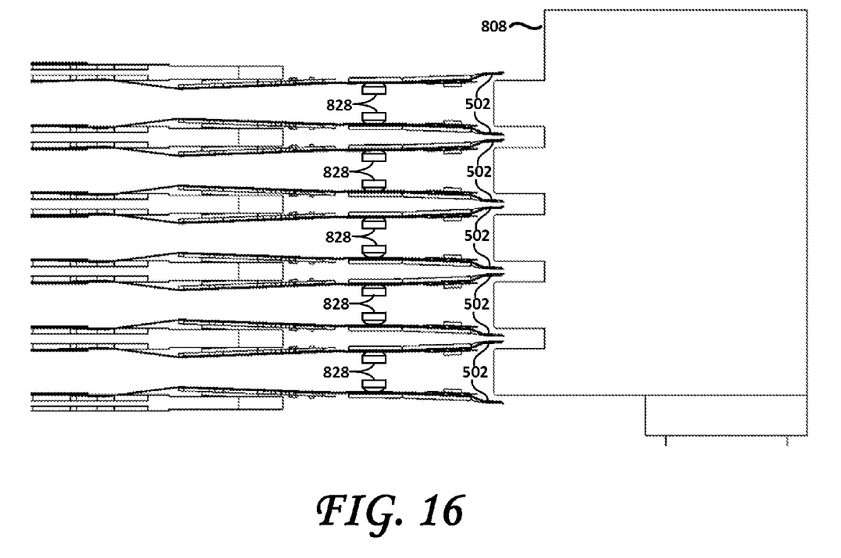
FIG. 16 is a side view of the HGAs, deflected load beams, and head spreader tabs and a disk simulator assembly, according to one embodiment.

FIG. 16 is a simplified side view of the HGAs, the disk simulator assembly 808 the head spreader tabs 828, according to one embodiment. FIG. 16 illustrates an initial state before or between gram load measurements. In this state, the head spreader tabs 828 have been actuated to spread the sliders of the HSA such that the suspension tabs 502 face, but do not contact, their corresponding facing surface on the disk simulator assembly 808. As shown, pairs of HGAs (according to one embodiment, pairs thereof that comprise sliders configured to read and write data from separate but immediately adjacent disks 46) may be suitably deflected by the head spreader tabs 828 such that may be interdigitated within corresponding openings defined within the disk simulator assembly 808. Other HGAs (such as, for example, those to which the top-most and bottom-most sliders are coupled) may be, as shown in FIG. 16, disposed so as to face a top-facing bearing surface and a bottom-facing bearing surface of the disk simulator assembly 808, respectively.

Figure 17:
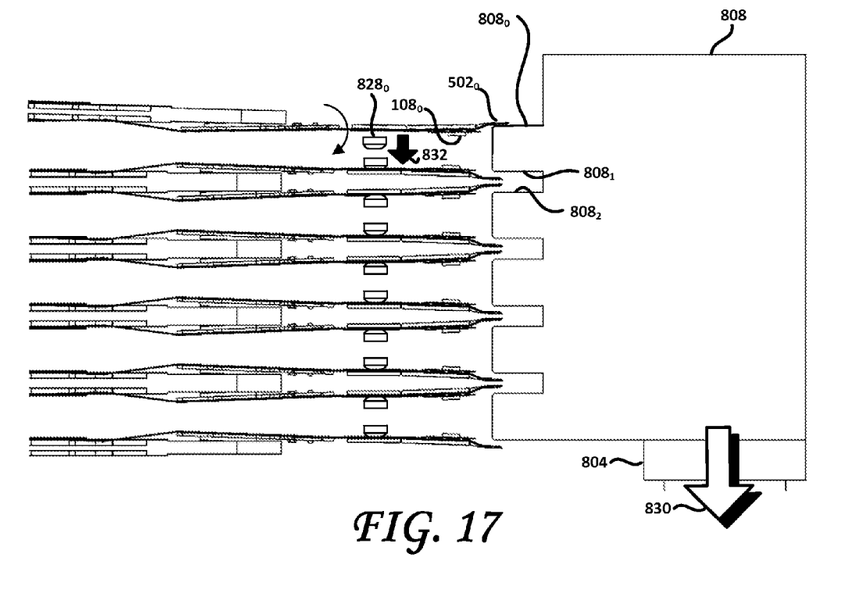
FIG. 17 illustrates the manner in which the suspension tab acts upon bearing surfaces of the disk simulator assembly when a head spreader tab is moved away from its associated HGA by a head separator tab actuator.

FIG. 17 illustrates the manner in which the suspension tabs acts upon the disk simulator assembly 808 when a head spreader tab 828 is moved away from its associated HGA by a corresponding head separator tab actuator coupled thereto, according to one embodiment. As shown therein, when it is desired to measure the gram load of head 0 (shown as slider $108_0$, coupled to the top-most HGA in FIG. 17), the pneumatic air gripper assembly 816 may act upon the spreader tab actuation element 818 coupled to head spreader tab $828_0$. This releases the HGA to which head 0 (slider $108_0$) is coupled, which elastically tends to move from its initial, deflected state in the direction indicated at 832 until the suspension tab $502_0$ comes into contact with and bear against the facing surface $808_0$ of the disk simulator assembly 808. This force, illustrated in FIG. 17 at 830, is transmitted through the load cell tower 804 to the load cell assembly 806 in the base assembly 702. The load cell assembly 806 may then generate an output related to the exerted force 830, from which output a quantity representative of the gram load of head 0 may be derived. The gram loads of other sliders may be similarly measured, by moving a corresponding head spreader tab 828 away from the HGA to thereby cause the suspension tab thereof to come into contact and bear against a facing bearing surface ($808_1$, $808_2$ . . . ) of the disk simulator assembly 808. The gram load of the sliders may be measured sequentially or in any order. The measured/derived gram loads and/or other intermediate values may be stored in a memory disposed, for example, in the base assembly 702 and/or exterior thereto. As may be seen from FIG. 17, at no time do the sliders of the HGAs come into contact with the disk simulator assembly 808 or any other surfaces during the gram load measurement procedure, thereby sparing the ABSs thereof damage or contamination that may otherwise occur had the sliders been the datum against which the gram load was measured.

Advantageously, one embodiment may be configured to carry out HGA gram load measurements using the suspension tabs of the HGAs using a top tooling assembly 704 that may comprise individually-actuable head spreader tabs 828. According to one embodiment, the configuration of the pneumatic air gripper assembly 816 and the number and configuration of the spreader tab actuation elements 818 and that of the head spreader tabs 828 may be modified at will to conform to the structure (e.g., size, shape and number of actuator arms) of different actuator assemblies. Likewise, according to one embodiment, the disk simulator assembly 808 may be modular and may be configured for easy removal and replacement with a different disk simulator assembly configured for other actuator assemblies.

The base assembly 702 may also be modular and may be configured to accommodate different top tooling assemblies 704 configured for different actuator assemblies. Indeed, rather than modifying the top tooling assembly 704 to accommodate different actuator assemblies, different top tooling assemblies 704 may be configured for different actuator assemblies and may be configured to be hot swappable onto a same base assembly 702. Other permutations are possible. For example, the base and top tooling assemblies 702, 704 may be integrated into a single device.

According to one embodiment, precise control over the displacement imposed by the heads spreader tabs 828 on the HGAs is desired, to prevent stacking up tolerances of displacement variations during gram load testing. For example, according to one embodiment, the displacement imposed upon the HGAs by the head spreader tabs (see, e.g., the displacement imposed on head 0 from its state in FIG. 16 to its state in FIG. 17) may be controlled such that the stacking up of displacement errors across sliders is kept to less than about 10% or less.

According to one embodiment, the head spreader assembly 814, comprising at least the pneumatic air gripper assembly 816, the spreader tab actuation elements 818 and the head spreader tabs 828, may be configured to minimize external forces applied to the constituent load beams of the actuator assembly in order to eliminate distortion and side effects of machine operation that may impact other parameters of the HSA. Toward that end, the head spreader tabs 828 may be configured to have minimal contact with the load beam, with a minimized amount of shock load.

Figure 18:
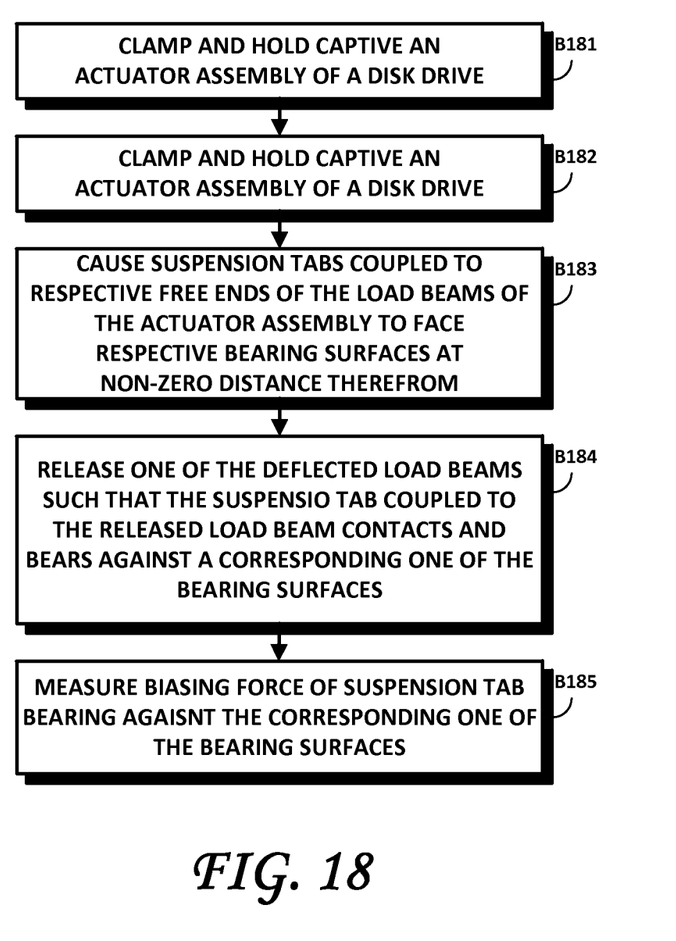
FIG. 18 is a flowchart of a method, according to one embodiment.

FIG. 18 is a flowchart of a method, according to one embodiment. As shown, the method may comprise, as shown at B181, clamping and holding captive an actuator assembly of a disk drive, the actuator assembly comprising a plurality of load beams. Block B182 calls for deflecting the plurality of load beams. As further shown in FIG. 18, block B183 calls for causing suspension tabs coupled to respective free ends of the load beams to face respective bearing surfaces. As shown at B184, one of the deflected load beams may then be released such that the suspension tab coupled to the released load beam contacts and bears against a corresponding one of the bearing surfaces. As shown at block B185, the biasing force of the suspension tab bearing against the corresponding one of the bearing surfaces may then be measured.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure.

What is claimed is:

1. A device for measuring a gram load, comprising:
a disk drive actuator clamping assembly configured to clamp down on and hold captive an actuator assembly of a disk drive, the actuator assembly comprising a plurality of head gimbal assemblies (HGA), wherein each of the plurality of HGAs comprises a slider and a suspension tab disposed away from the slider at a distal free end of the HGA;
a disk simulator assembly comprising a separately-disposed bearing surface corresponding to each slider of a first set of HGAs on the actuator assembly;
a load cell assembly configured to generate an output related to a force exerted by a suspension tab on the disk simulator assembly; and
a head spreader assembly configured to spread the sliders of the first set of HGAs such that suspension tabs of the spread sliders face a respective one of the bearing surfaces of the disk simulator assembly at a predetermined non-zero distance therefrom, the head spreader assembly being configured to selectively release a HGA such that the suspension tab thereof contacts and bears against its corresponding bearing surface to thereby enable the load cell assembly to measure the force and to generate the output.

2. The device of claim 1, wherein the disk simulator assembly and the head spreader assembly are configured such that respective air bearing surfaces (ABS) of the sliders of the first set of HGAs do not contact the bearing surfaces of the disk simulator assembly.

3. The device of claim 1, wherein the disk simulator assembly is configured to be modular and swappable, to conform to different actuator assemblies.

4. The device of claim 1, further comprising a base assembly configured to house the load cell assembly and a top tooling assembly comprising the disk drive actuator clamping assembly, the disk simulator assembly and the head spreader assembly.

5. The device of claim 4, wherein the top tooling assembly is configured to removably couple to the base assembly.

6. The device of claim 1, wherein the head spreader assembly is configured to be pneumatically-actuated.

7. The device of claim 1, wherein the head spreader assembly is configured to interdigitate at least some of the suspension tabs within openings in the disk simulator assembly that define the bearing surfaces.

8. The device of claim 1, wherein the head spreader assembly comprises an individually-actuable head spreader tab for each slider of the first set of HGAs, each head spreader tab being configured to contact a corresponding HGA away from the slider thereof.

* * * * *